(12) United States Patent
Spangler et al.

(10) Patent No.: US 11,459,897 B2
(45) Date of Patent: Oct. 4, 2022

(54) COOLING SCHEMES FOR AIRFOILS FOR GAS TURBINE ENGINES

(71) Applicant: Raytheon Technologies Corporation, Farmington, CT (US)

(72) Inventors: Brandon W. Spangler, Vernon, CT (US); Dominic J. Mongillo, Jr., West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 176 days.

(21) Appl. No.: 16/859,181

(22) Filed: Apr. 27, 2020

(65) Prior Publication Data

US 2020/0347734 A1     Nov. 5, 2020

Related U.S. Application Data

(60) Provisional application No. 62/842,656, filed on May 3, 2019.

(51) Int. Cl.
*F01D 5/18*          (2006.01)

(52) U.S. Cl.
CPC ............. *F01D 5/186* (2013.01); *F01D 5/187* (2013.01); *F05D 2220/323* (2013.01); *F05D 2240/126* (2013.01); *F05D 2240/301* (2013.01); *F05D 2260/202* (2013.01); *F05D 2260/22141* (2013.01)

(58) Field of Classification Search
CPC .... F01D 5/186; F01D 5/187; F05D 2220/323; F05D 2240/126; F05D 2240/301; F05D 2260/202; F05D 2260/22141; F05D 2260/201
See application file for complete search history.

(56) References Cited

U.S. PATENT DOCUMENTS

| | | | | |
|---|---|---|---|---|
| 4,180,373 A * | 12/1979 | Moore | ..................... | F01D 5/187 415/115 |
| 5,156,526 A | 10/1992 | Lee et al. | | |
| 5,538,394 A * | 7/1996 | Inomata | ..................... | F28F 3/02 416/97 R |

(Continued)

OTHER PUBLICATIONS

European Search Report for European Application No. 20172785.6, International Filing Date May 4, 2020, dated Sep. 10, 2020, 8 pages.

*Primary Examiner* — Justin D Seabe
*Assistant Examiner* — Andrew Thanh Bui
(74) *Attorney, Agent, or Firm* — Cantor Colburn LLP

(57) ABSTRACT

Airfoils for gas turbine engines are described. The airfoils include a leading edge, a trailing edge, a pressure side exterior wall, and a suction side exterior wall. A plurality of cooling passages are formed within the airfoil. A plurality of first interior ribs extend from the pressure side exterior wall to the suction side exterior wall, and a plurality of second interior ribs extend from the suction side exterior wall toward the pressure side exterior wall and intersect with a first interior rib. At least one pressure side main body cooling passage is defined between the pressure side exterior wall and two first interior ribs of the plurality of first interior ribs and at least one suction side main body cooling passage is defined between the suction side exterior wall, a first interior rib, and a second interior rib.

20 Claims, 5 Drawing Sheets

(56) References Cited

U.S. PATENT DOCUMENTS

| | | | |
|---|---|---|---|
| 5,660,524 A | | 8/1997 | Lee et al. |
| 6,206,638 B1 | | 3/2001 | Glynn et al. |
| 6,416,284 B1 | * | 7/2002 | Demers ................. F01D 5/186 416/97 R |
| 7,097,426 B2 | * | 8/2006 | Lee ........................ F01D 5/187 416/97 R |
| 7,131,818 B2 | | 11/2006 | Cunha et al. |
| 7,217,092 B2 | | 5/2007 | Lee et al. |
| 7,871,245 B2 | | 1/2011 | Pietraszkiewicz et al. |
| 8,057,183 B1 | * | 11/2011 | Liang ..................... F01D 5/187 416/97 R |
| 8,070,443 B1 | * | 12/2011 | Liang ..................... F01D 5/187 416/97 R |
| 8,366,395 B1 | * | 2/2013 | Liang ..................... F01D 5/186 416/97 R |
| 9,739,155 B2 | * | 8/2017 | Smith ..................... F01D 5/188 |
| 10,378,364 B2 | * | 8/2019 | Spangler ................ F01D 5/187 |
| 11,149,550 B2 | * | 10/2021 | Spangler ................ F01D 5/141 |
| 2007/0128034 A1 | * | 6/2007 | Lee ........................ F01D 5/187 416/97 R |
| 2010/0254824 A1 | * | 10/2010 | Naik ...................... F01D 5/186 416/97 R |

\* cited by examiner

COOLING SCHEMES FOR AIRFOILS FOR GAS TURBINE ENGINES

CROSS REFERENCE TO RELATED APPLICATIONS

This application claims the benefit of an earlier filing date from U.S. Provisional Application Ser. No. 62/842,656, filed May 3, 2019, the entire disclosure of which is incorporated herein by reference.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

The compressor section and the turbine section each have airfoils including rotating blades and stationary vanes. It may be desirable to provide a cooling (or heating in the case of the compressor section) airflow through the airfoils due to the relatively great temperatures at which they are operated. In that regard, the airfoils may include exterior walls along with internal ribs or walls that form internal air passages through which a cooling airflow may flow. Because the exterior walls are exposed to relatively hot gaspath air, they may experience greater thermal expansion than the internal ribs or walls. Such difference in thermal expansion undesirably results in compressive and tensile stress experienced between the exterior walls and the internal ribs or walls.

BRIEF DESCRIPTION

According to some embodiments, airfoils for gas turbine engines are provided. The airfoils include a leading edge, a trailing edge, a pressure side exterior wall extending between the leading edge and the trailing edge and defining a pressure side, and a suction side exterior wall extending between the leading edge and the trailing edge and defining a suction side, wherein a plurality of cooling passages are formed within the airfoil. A plurality of first interior ribs extend from the pressure side exterior wall to the suction side exterior wall and a plurality of second interior ribs extend from the suction side exterior wall toward the pressure side exterior wall and intersect with one of the first interior ribs of the plurality of first interior ribs. At least one pressure side main body cooling passage is defined between the pressure side exterior wall and two first interior ribs of the plurality of first interior ribs and at least one suction side main body cooling passage is defined between the suction side exterior wall, a first interior rib, and a second interior rib.

In addition to one or more of the features described above, or as an alternative, further embodiments of the airfoils may include that the plurality of cooling passages further comprises at least one isolated main body cooling passage defined between two first interior ribs and two second interior ribs.

In addition to one or more of the features described above, or as an alternative, further embodiments of the airfoils may include that the plurality of cooling passages further comprises at least one leading edge cooling passage arranged along the leading edge of the airfoil.

In addition to one or more of the features described above, or as an alternative, further embodiments of the airfoils may include that the plurality of cooling passages further comprises at least one trailing edge cooling passages arranged along the trailing edge of the airfoil.

In addition to one or more of the features described above, or as an alternative, further embodiments of the airfoils may include that the airfoil defines a camber line extending from the leading edge to the trailing edge, wherein the camber line is defined as a line that is equidistant from the pressure side and the suction side, wherein the camber line passes through each pressure side main body cooling passage.

In addition to one or more of the features described above, or as an alternative, further embodiments of the airfoils may include that the camber line defines a camber line height $H_C$ and the pressure side main body cooling passage has a passage height from a base to an apex defined as $1.1 \cdot H_C \leq H_1 \leq 2.0 \cdot H_C$.

In addition to one or more of the features described above, or as an alternative, further embodiments of the airfoils may include that the airfoil defines a camber line extending from the leading edge to the trailing edge, wherein the camber line is defined as a line that is equidistant from the pressure side and the suction side, wherein the camber line does not intersect any of the suction side main body cooling passages.

In addition to one or more of the features described above, or as an alternative, further embodiments of the airfoils may include that the camber line defines a camber line height $H_C$ and the suction side main body cooling passage has a passage height from a base to an apex defined as $0.1 \cdot H_C \leq H_1 \leq 1.0 \cdot H_C$.

In addition to one or more of the features described above, or as an alternative, further embodiments of the airfoils may include a first heat transfer augmentation feature formed on the pressure side exterior wall within the pressure side main body cooling passage and a second heat transfer augmentation feature formed on the suction side exterior wall within the suction side main body cooling passage.

In addition to one or more of the features described above, or as an alternative, further embodiments of the airfoils may include that each of the first and second heat transfer augmentation features have a height between 0.005 inches and 0.020 inches.

In addition to one or more of the features described above, or as an alternative, further embodiments of the airfoils may include that the first heat transfer augmentation feature has a first height $E_1$ and the pressure side main body cooling passage has a first passage height $H_1$, wherein:

$$\frac{E_1}{H_1} < 0.05.$$

In addition to one or more of the features described above, or as an alternative, further embodiments of the airfoils may include that the second heat transfer augmentation feature has a second height $E_2$ and the suction side main body cooling passage has a second passage height $H_2$, wherein:

$$0.50 \geq \frac{E_2}{H_2} \geq 0.10.$$

In addition to one or more of the features described above, or as an alternative, further embodiments of the airfoils may include that each of the first and second heat transfer augmentation features comprises at least one of a normal trip strip, a skewed trip strip, a chevron trip strip, a hemispherical protrusion, and a pin fin.

In addition to one or more of the features described above, or as an alternative, further embodiments of the airfoils may include that a cross-sectional area of the at least one pressure side main body cooling passage in a flow direction through the at least one pressure side main body cooling passage is greater than a cross-sectional area of the at least one suction side main body cooling passage in a flow direction through the at least one suction side main body cooling passage.

According to some embodiments, gas turbine engines are provided. The gas turbine engines include a turbine section, a compressor section, and an airfoil located in at least one of the turbine section and the compressor section. The airfoil includes a leading edge, a trailing edge, a pressure side exterior wall extending between the leading edge and the trailing edge and defining a pressure side, and a suction side exterior wall extending between the leading edge and the trailing edge and defining a suction side, wherein a plurality of cooling passages are formed within the airfoil. A plurality of first interior ribs extending from the pressure side exterior wall to the suction side exterior wall and a plurality of second interior ribs that extend from the suction side exterior wall toward the pressure side exterior wall and intersect with a first interior rib. At least one pressure side main body cooling passage is defined between the pressure side exterior wall and two first interior ribs of the plurality of first interior ribs and at least one suction side main body cooling passage is defined between the suction side exterior wall, a first interior rib, and a second interior rib.

In addition to one or more of the features described above, or as an alternative, further embodiments of the gas turbine engines may include that the plurality of cooling passages further comprises at least one isolated main body cooling passage defined between two first interior ribs and two second interior ribs.

In addition to one or more of the features described above, or as an alternative, further embodiments of the gas turbine engines may include that the plurality of cooling passages further comprises at least one of a leading edge cooling passage arranged along the leading edge of the airfoil and a trailing edge cooling passage arranged along the trailing edge of the airfoil.

In addition to one or more of the features described above, or as an alternative, further embodiments of the gas turbine engines may include that the airfoil defines a camber line extending from the leading edge to the trailing edge, wherein the camber line is defined as a line that is equidistant from the pressure side and the suction side, wherein at least one of (i) the camber line passes through each pressure side main body cooling passage, and (ii) the camber line does not intersect any of the suction side main body cooling passages.

In addition to one or more of the features described above, or as an alternative, further embodiments of the gas turbine engines may include a first heat transfer augmentation feature formed on the pressure side exterior wall within the pressure side main body cooling passage and a second heat transfer augmentation feature formed on the suction side exterior wall within the suction side main body cooling passage.

In addition to one or more of the features described above, or as an alternative, further embodiments of the gas turbine engines may include that a cross-sectional area of the at least one pressure side main body cooling passage in a flow direction through the at least one pressure side main body cooling passage is greater than a cross-sectional area of the at least one suction side main body cooling passage in a flow direction through the at least one suction side main body cooling passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
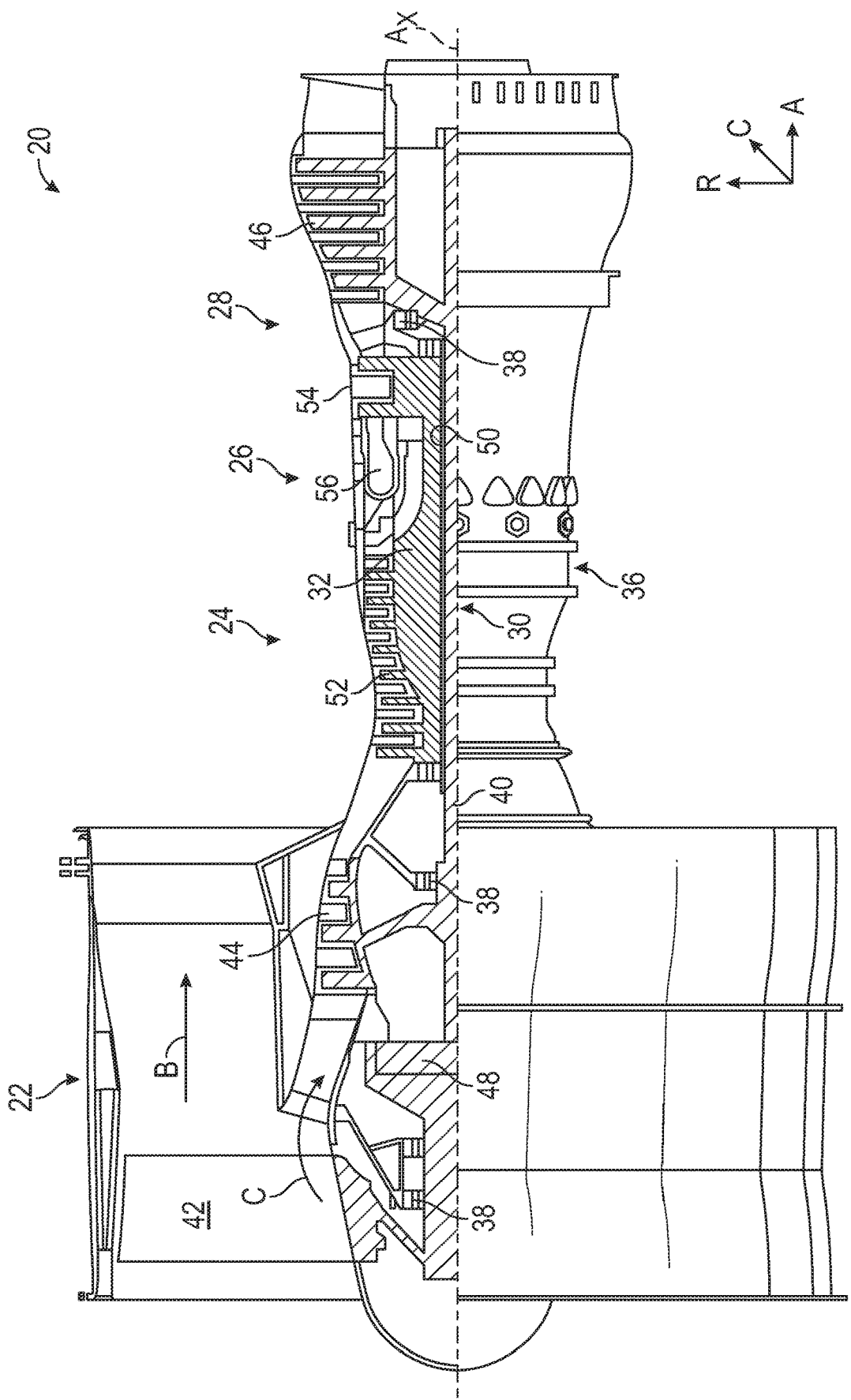
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis $A_x$ (left and right on FIG. 1). Further, radially inward refers to a negative radial direction relative to the engine axis $A_x$ and radially outward refers to a positive radial direction (radial being up and down in the cross-section of the page of FIG. 1). A circumferential direction C is a direction relative to the engine axis $A_x$ (e.g., a direction of rotation of components of the engine; in FIG. 1, circumferential is a direction into and out of the page, when offset from the engine axis AO. An A-R-C axis is shown throughout the drawings to illustrate the relative position of various components.

The exemplary engine 20 generally includes a low speed spool 30 and a high speed spool 32 mounted for rotation about the engine central longitudinal axis $A_x$ relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
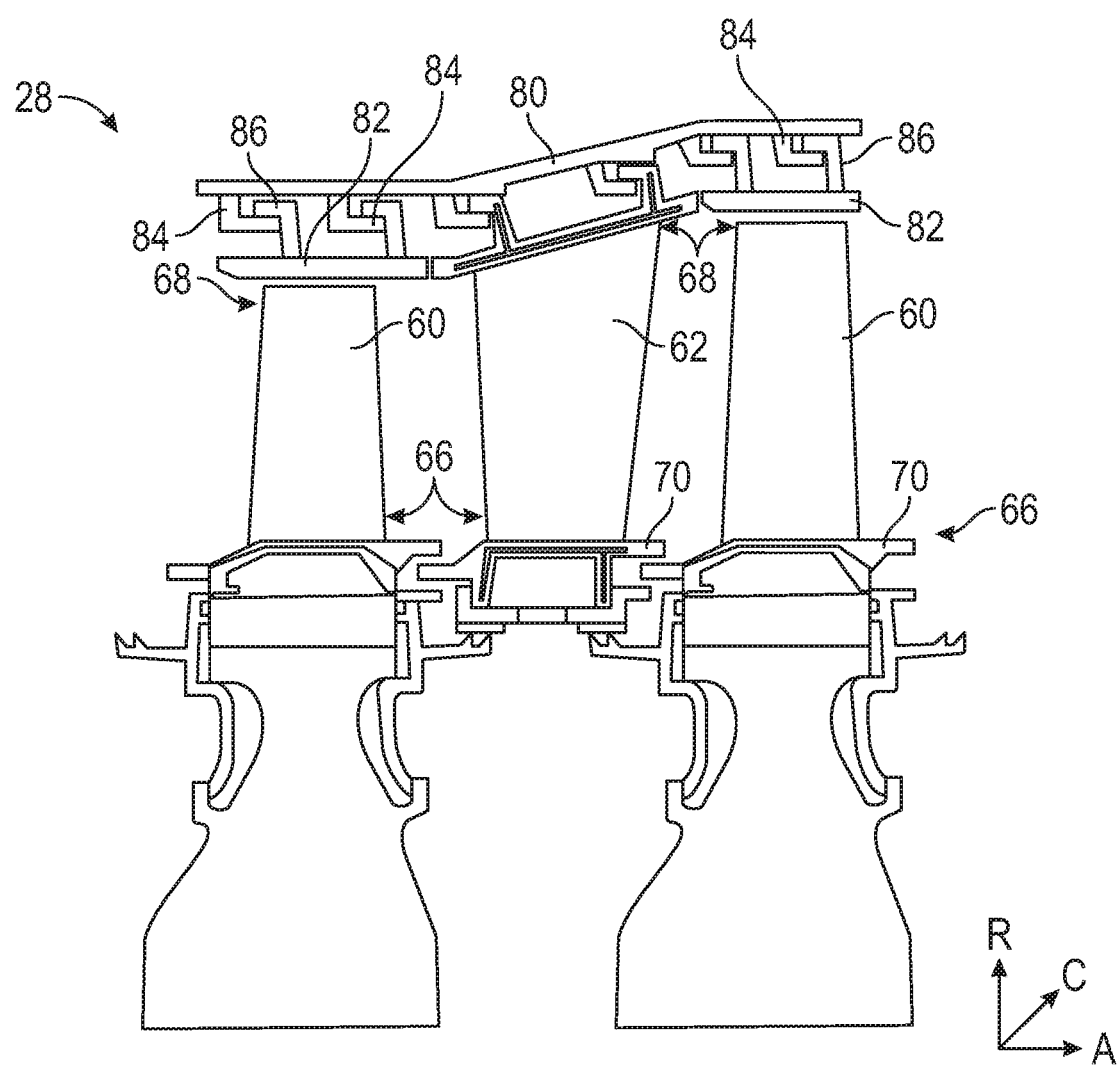
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities or cooling passages defining a number of channels, hereinafter airfoil cooling passages, formed therein and extending from an inner diameter 66 to an outer diameter 68, or vice-versa. The airfoil cooling passages may be separated by partitions within the airfoils 60, 62 that may extend either from the inner diameter 66 or the outer diameter 68 of the airfoil 60, 62. In some embodiments, the partitions may extend the entire length of the component. In some embodiments, the partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis $A_x$) may be airflow ports and/or bleed orifices that enable air to bleed from the internal cooling passages of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
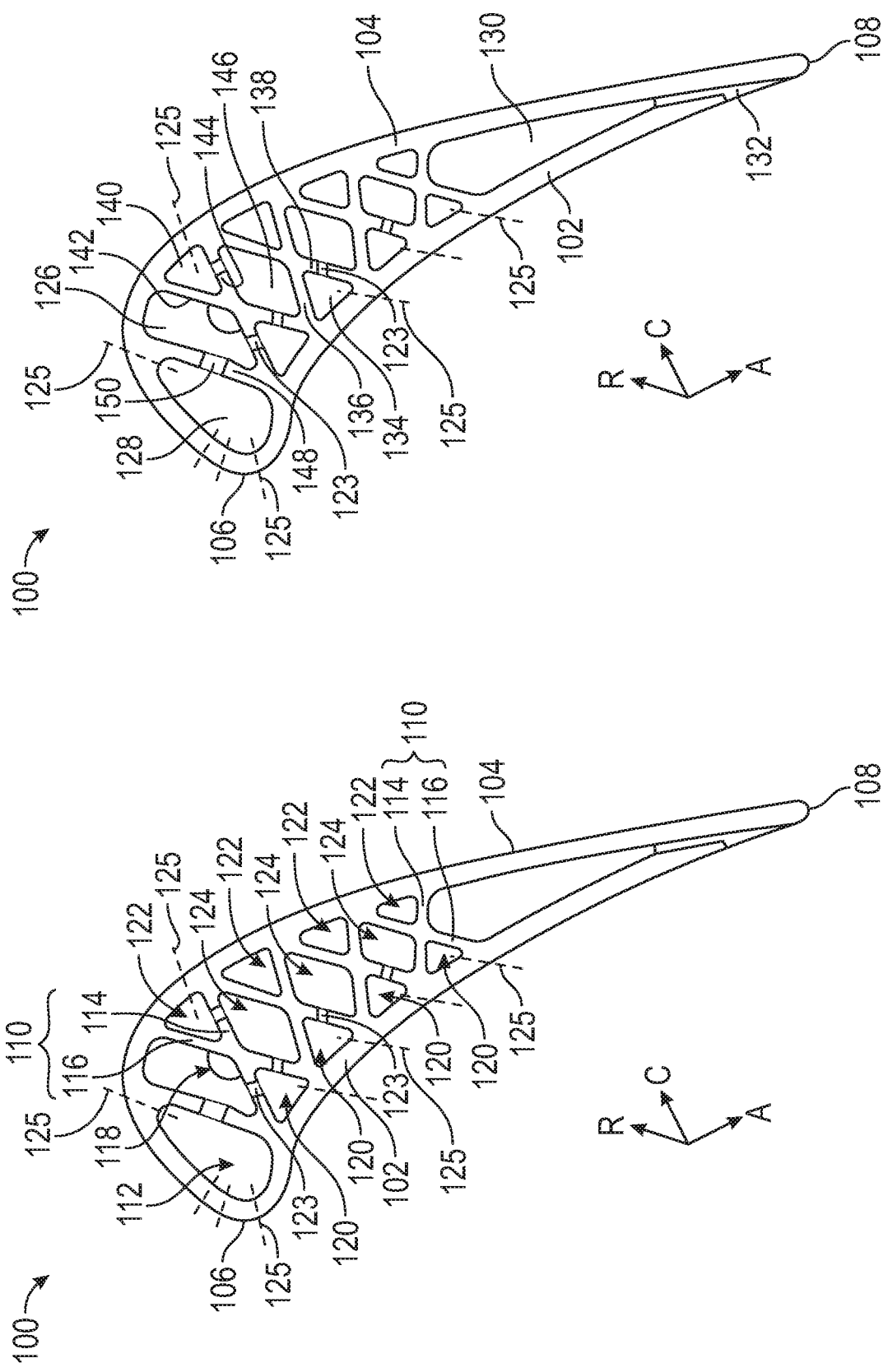
FIG. 3A is a schematic illustration of an airfoil having internal cooling passages.
FIG. 3B is an alternatively labeled version of the airfoil of FIG. 3A.

Referring now to FIGS. 3A-3B, an airfoil 100 in accordance with the present disclosure is shown. The airfoil 100 may be a blade employed in a turbine or compressor section of a gas turbine engine. The airfoil 100 has a pressure side exterior wall 102 and a suction side exterior wall 104. The pressure side exterior wall 102 may receive a hot airflow from a combustor section of the gas turbine engine. In that regard, the pressure side exterior wall 102 may be exposed to greater pressure than the suction side exterior wall 104 during operation of the gas turbine engine. The hot airflow may cause the airfoil 100 to rotate about the engine axis $A_x$, as will be appreciated by those of skill in the art. The airfoil 100 includes a leading edge 106 and a trailing edge 108. The leading edge 106 may be located axially forward of the trailing edge 108 and may receive the hot airflow prior to the trailing edge 108.

The airfoil 100, as shown, includes interior ribs 110 that define multiple air passages 112 therebetween. Further, at least one of the air passages 112 may also be defined by the pressure side exterior wall 102 and/or the suction side exterior wall 104, as illustratively shown. The interior ribs 110 may be arranged into sets of ribs, with a set of first interior ribs 114 oriented in a first direction and a set of second interior ribs 116 oriented in a second direction that may differ from the first direction. The interior ribs 110 may define multiple air passages 112 within the airfoil 100. The multiple air passages 112 may receive a cooling airflow to reduce a temperature of the airfoil 100.

Each of the interior ribs of the set of first interior ribs 114 may be oriented at an angle 118 relative to the each of the ribs of the set of second interior ribs 116. In some example embodiments, the angle 118 may be between 30° and 150°. In some embodiments, each of the interior ribs 110 may contact at least one of the pressure side exterior wall 102 or the suction side exterior wall 104 and the interior ribs 110 may not extend all the way to the opposing pressure side or suction side exterior wall 102, 104. As such, in some embodiments, the interior ribs 110 may create triangular passages adjacent to only one of the pressure side exterior wall 102 or suction side exterior wall 104. In some embodiments, each of the interior ribs 110 may extend from the pressure side exterior wall 102 to the suction side exterior wall 104. In that regard, the interior ribs 110 may form a modified truss structure that defines the multiple air passages 112 (as illustratively shown in FIG. 3A) including a first plurality of triangular air passages 120 (pressure side), a second plurality of triangular air passages 122 (suction side), and a plurality of internal air passages 124. In some embodiments and as shown in FIG. 3A, the internal air passages 124 are diamond shaped. Some of the interior ribs 110 may be arranged to form one or more leading edge cooling passages including a leading edge feed cooling passage 126 and a leading edge cooling passage 128, as shown in FIG. 3B. The interior ribs 110 may further form one or more trailing edge cooling passages including a trailing edge cooling passage 130, as shown in FIG. 3B.

In some embodiments, interior ribs of the first set of interior ribs 114 and the ribs of the second set of interior ribs 116 are oriented such that the angle 118 that is formed between the respective ribs may vary between 30° and 150°. Interior ribs of each set of interior ribs 114, 116 intersect and bisect the airfoil 100 at a location that is approximate the mean camber line, located between the airfoil pressure side exterior wall 102 and suction side exterior wall 104. The interior ribs 110 have partial rib segments (of the sets of ribs 114, 116 which generally fully extend between the pressure side exterior wall 102 and suction side exterior wall 104) that partially extend to a location approximate the mean camber line.

The multiple air passages 112 may be oriented in such a way as to segregate the cooling flows into different regions. For example, the first plurality of triangular air passages 120 may transport a pressure side cooling airflow, and the second plurality of triangular air passages 122 may transport a suction side cooling airflow. The internal air passages 124 may function as tip feed passages to transport cooling air to an inner diameter or an exterior diameter extent of the airfoil 100 (e.g., to the tip). Because the internal air passages 124 are bordered by the interior ribs 110 only, instead of the pressure side exterior wall 102 or the suction side exterior wall 104, the cooling airflow traveling through the internal air passages 124 remains relatively cool. In that regard, the internal air passages 124 may provide relatively cool air to the inner diameter or the exterior diameter extent of the airfoil 100.

In some embodiments, and as shown, the internal passage may be used to provide resupply cooling air flow, through one or more resupply flow apertures 123, to either, or at least one of the first plurality of triangular air passages 120 and/or at least one of the second triangular air passages 122. The resupply flow apertures 123, as shown, emanate from the internal air passages 124 and provide a fluidic connection through which relatively higher pressure and lower temperature cooling air may be provided to the respective first and second plurality of triangular passages 120, 122. The resupply of higher pressure, colder cooling air from the internal air passages 124 may be required to mitigate internal flow separation that may occur in the triangular air passages 120, 122 due to Coriolis forces that occur in rotating air passages. In addition to mitigating adverse internal convective heat transfer consequences related to rotating passages, the resupply flow apertures 123 emanating from the internal air passages 124 may also be necessary to mitigate excessive cooling air heat pickup and/or high pressure losses that may be incurred in respective triangular air passages 120, 122.

It will be appreciated by those of skill in the art that the location of the resupply flow apertures 123 shown in the illustrative figures are for illustrative purposes and are not limiting in any way. That is, any combination, orientation, and selection of connected passages by use of resupply flow apertures may be used and/or optimized based on the local external heat flux, cooling flow, pressure loss, and cooling air temperature heat pickup in order achieve local and overall component thermal cooling effectiveness and durability life requirements, without departing from the scope of the present disclosure.

Further, in some embodiments and as shown, film cooling hole apertures 125 may be formed to emanate from any of the internal cooling passages 112, 120, 122 to expel air to an exterior of the airfoil 100. In some such configurations, it may be necessary to incorporate the resupply flow apertures 123, fed from the internal air passages 124 to respective triangular passages 120, 122 to ensure adequate pressure ratio and back flow margin is maintained across the film cooling hole apertures 125 in order to achieve local film cooling effectiveness and thermal cooling performance requirements.

The leading edge feed cooling passage 126 and the leading edge cooling passage 128 may be configured to transport a leading edge cooling airflow. In some configurations, an airflow from the leading edge feed cooling passage 126 into the leading edge cooling passage 128 may be an impinging flow. Further, one or more film cooling hole apertures 125 may be located on the leading edge 106 such that a film layer may be formed on the exterior surface of the airfoil 100, as will be appreciated by those of skill in the art. The trailing edge cooling passage 130 may be arranged to transport a trailing edge cooling airflow. The trailing edge cooling airflow may exit the airfoil 100 through one or more trailing edge cooling exits 132, such as holes, slots, etc., as will be appreciated by those of skill in the art.

With respect to the interior cavities (i.e., between the leading edge 126, 128 and trailing edge 130 cavities) are the geometric shaped first plurality of triangular air passages 120, the second plurality of triangular air passages 122, and the plurality of internal air passages 124. The first plurality of triangular air passages 120 may each be bordered by a combination of one or more of the interior ribs 110 and the pressure side exterior wall 102. For example, the first plurality of triangular air passages 120 may include a first triangular air passage 134. The first triangular air passage 134 may have a first wall that is defined by a first interior rib 136, a second wall that is defined by a second interior rib 138, and a third wall that is defined by the pressure side exterior wall 102.

Similarly, the second plurality of triangular air passages 122 may each be bordered by a combination of one or more of the interior ribs 110 and the suction side exterior wall 104. For example, the second plurality of triangular air passages 122 may include a second triangular air passage 140. The second triangular air passage 140 may have a first wall that is defined by a third rib 142, a second wall that is defined by a fourth rib 144, and a third wall that is defined by the suction side exterior wall 104.

The internal air passages 124 may be bordered entirely by three or more ribs of the interior ribs 110. For example, the internal air passages 124 may include a first internal air passage 146 that is bordered entirely by interior ribs 110. In this illustrative embodiment and configuration, the first internal air passage 146 has four sides, each side defined by a portion of the first interior rib 136, the second interior rib 138, the third rib 142, and the fourth rib 144.

One or more of the interior ribs 110 may define openings between adjacent air passages 112. For example, shown proximate the leading edge 106, an interior rib 148 may define a cooling flow aperture opening 150 between the leading edge feed cooling passage 126 and the leading edge cooling passage 128. The cooling flow aperture opening 150 may allow air to transfer between the leading edge feed cooling passage 126 and the leading edge cooling passage 128, as described above. The cooling flow aperture opening 150 may be one or more (e.g., an array) of impingement holes between the leading edge feed cooling passage 126 and the leading edge cooling passage 128. Likewise, one or more of the internal air passages 112 defined by the interior ribs 110 may include cooling holes, bleed holes, transfer holes, impingement holes, etc. For example, the pressure side exterior wall 102 may include the trailing edge cooling exits 132 designed to facilitate movement of the cooling airflow from the trailing edge cooling passage 130 to the pressure side exterior wall 102 in order to cool the pressure side exterior wall 102. Additional holes or apertures may be arranged in or through one or more of the interior ribs 110 and/or on the pressure side 102 or the suction side 104 of the airfoil to provide a desired cooling scheme, as will be appreciated by those of skill in the art. Further, in some embodiments, the internal cooling passages (those not at the leading or trailing edge) may each be fluidly separated or separate from each of the other internal cooling passages.

In order to achieve the target oxidation and thermal mechanical fatigue lives in modern engines with high gas-path temperatures and low cooling flow allotments, a cooling scheme is needed that utilizes the cooling air effectively to meet the oxidation lives and still provide the flexibility that the airfoils need to meet the thermal mechanical fatigue lives. Some airfoils are configured to provide sufficient heat transfer on both the pressure and suction side exterior walls of a blade by utilizing a cold internal wall that is parallel to the exterior wall(s) and ribs that are perpendicular to the exterior wall (e.g., circumferentially extending ribs). A disadvantage of this type of geometric arrangement is the high compressive strains that are induced in the hot exterior wall due to the relatively large differential in absolute operating metal temperature that exists between the cold internal wall and the hot exterior wall. The metal temperature difference between the cold internal wall and the hot exterior wall adversely impacts the relative rate of thermal expansion. In this sense, the stiff cold internal wall thereby constrains the expansion of the hot exterior wall, increasing both compressive stresses and strains. Such high compressive strains reduce the thermal mechanical fatigue capability of the hot exterior wall, resulting in premature crack initiation and accelerated crack propagation.

To address this, a truss-configuration, for example as shown and described above, provides for increases to the thermal mechanical fatigue life by replacing the cold parallel internal wall and perpendicular ribs that cause the high compressive strains with ribs that intersect in an x-shape or truss arrangement. Such blades are also shown and described in U.S. patent application Ser. No. 15/806,224, which is incorporated by reference in its entirety. The x-shape arrangement of the ribs can provide for a compliant structure that allows the exterior walls of the airfoil to expand without incurring significant compressive load stresses and strains due to the constrains associated with cold internal walls.

The intersection of internal rib geometries may form a non-optimal triangular passage aspect ratio of the suction side cooling passages. In this sense, the suction side triangular cooling passages may exhibit reduced convective cooling characteristics due to the adverse pressure gradients and passage vortices generated by the Coriolis forces that occur in rotating air passages along the "leading" internal wall surfaces (i.e., the suction side internal surfaces) immediately adjacent the hot exterior suction side airfoil wall. Similarly, the intersection of internal rib geometries may form a non-optimal triangular cooling passage aspect ratio of the pressure side cooling passages. In so doing, the pressure side triangular cooling passages may not leverage enhanced internal convective cooling characteristics due to the favorable pressure gradients and passage vortices generated by the Coriolis forces that occur in rotating air passages along the "trailing" internal wall surfaces (i.e., the pressure side internal surfaces) immediately adjacent the hot exterior pressure side airfoil wall.

In accordance with some embodiments of the present disclosure, rather than utilizing the x-shape arrangement shown in FIGS. 3A-3B, a Y-shaped arrangement of ribs arranged in opposing orientations may be employed to create relatively small suction side passages, relatively large pressure side passages, and some main body passages isolated from the gaspath. As used herein, the terms large and small with respect to the passages (or cavities) refers to a cross-sectional area in a flow direction through the respective passage (or cavity). That is, the flow area through which a cooling flow passes through a passage in a radial or flow direction through the respective passage.

Figure 4:
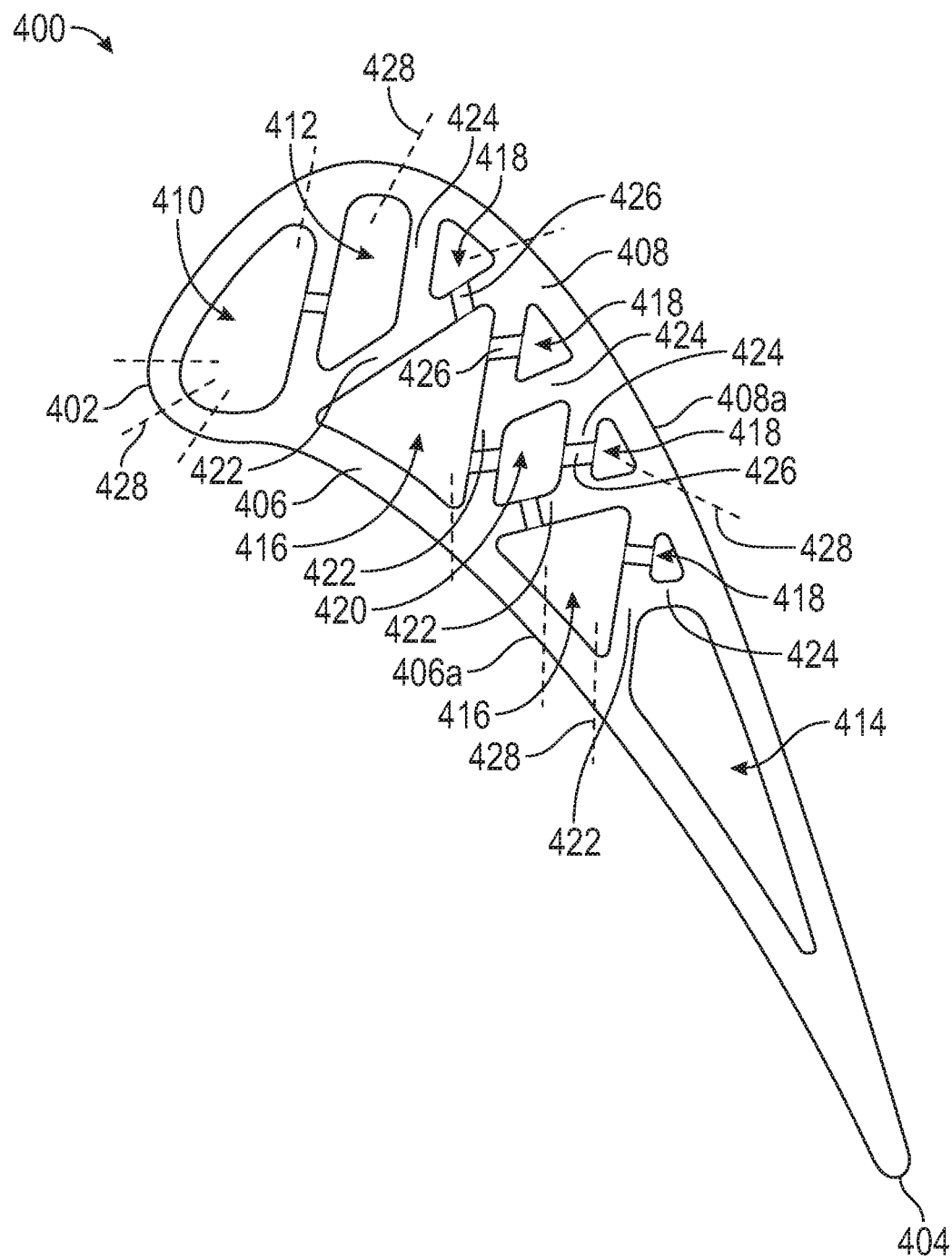
FIG. 4 is a schematic illustration of an airfoil in accordance with an embodiment of the present disclosure.

For example, turning now to FIG. 4, a schematic illustration of an airfoil 400 in accordance with an embodiment of the present disclosure is shown. The airfoil 400 has a leading edge 402, a trailing edge 404, a pressure side exterior wall 406, and a suction side exterior wall 408. The pressure side exterior wall 406 defines a pressure side 406a of the airfoil 400 that is exposed to a hot gaspath during operation of a gas turbine engine and the suction side exterior wall 408 defines a suction side 408a that is exposed to the hot gaspath during operation. The airfoil 400 includes a plurality of internal cavities or cooling passages that are configured to cooling the material of the airfoil 400 during operation. The internal passages can include, for example, a leading edge cooling passage 410, a leading edge feed passage 412, a trailing edge cooling passage 414, and a plurality of main body cooling passage 416, 418, 420. The main body cooling passages 416, 418, 420 include, as shown, pressure side main body cooling passages 416 (arranged along the pressure side 406 of the airfoil 400), suction side main body cooling passage 418 (arranged along the suction side 408 of the airfoil 400), and isolated main body passages 420 (arranged internally within the airfoil 400 and not exposed to an exterior side wall of the airfoil 400).

As illustratively shown in this embodiment, the pressure side main body cooling passages 416 have relatively large triangular shapes in cross-section (relative to a flow direction through the respective cooling passages). In contrast, the suction side main body cooling passages 418 have relatively small triangular shapes in cross-section. The isolated main body cooling passages 420 have generally diamond shapes in cross-section. The isolated main body cooling passages 420 are isolated from and not exposed to exterior hot gaspath surfaces of the airfoil 400.

The geometries are defined by ribs within the airfoil 400. As shown, first interior ribs 422 extend a full width of the airfoil 400 in a circumferential direction. That is, the first interior ribs 422 extend fully between the pressure side exterior wall 406 and the suction side exterior wall 408. Second interior ribs 424 extend a partial width of the airfoil 400 in a circumferential direction. That is, the second interior ribs 424 extend between a side wall 406, 408 and one of the first interior ribs 422. In the illustrative embodiment of FIG. 4, the second interior ribs 424 extend from the suction side exterior wall 408 and intersect with a first interior rib 422, with the first interior ribs 422 extending fully between the pressure side exterior wall 406 and the suction side exterior wall 408.

In this embodiment, the pressure side main body cooling passages 416 are defined between two first interior ribs 422 and a portion of the pressure side exterior wall 406. The triangular geometry of the pressure side main body cooling passages 416 is achieved by the two first interior ribs 422 starting at separate locations in a chordwise direction (i.e., in a direction from the leading edge 402 to the trailing edge 404) along the pressure side exterior wall 406 and converging to substantially the same location along the suction side exterior wall 408. The triangular geometry of the suction side main body cooling passages 418 is achieved by the arrangement of a second interior rib 424 extending from the suction side exterior wall 408 and intersecting with a portion of a first interior rib 422, rather than intersecting with the opposing pressure side exterior wall 406. The diamond geometry of the isolated main body cooling passages 420 is defined by portion of two first interior ribs 422 and two second interior ribs 424, as illustratively shown.

In some embodiments, the dimensions of the various interior main body cooling passages 416, 418 may be defined based on a relationship relative to a portion of a first interior rib 422 that defines a wall of the respective main body cooling passage 416, 418. In such configurations, for the triangular shape cooling passages shown in FIG. 4, an interior wall (in the circumferential direction) of a main body cooling passage 416, 418 may be defined as a percentage of a length of a respective first interior rib 422 (extending between the pressure side exterior wall 406 and the suction side exterior wall 408) that defines a wall or surface of a respective main body cooling passage 416, 418. For example, a length of wall (in the circumferential direction) of the pressure side main body cooling passage 416 may range between 85%-100% of the total length of a respective first interior rib 422. In contrast, length of wall (in the circumferential direction) of the suction side main body cooling passages 418 may range between 10%-50% of the total length of a respective first interior rib 422. Said differently, a wall of the suction side main body cooling passages 418 may be defined by a location where a respective second interior rib 424 intersects a respective first interior rib 422 at a location ranging between 10%-50% of the length of the first interior rib 422.

The first interior ribs 422 and the second interior ribs 424, as arranged as shown in FIG. 4, form a generally y-shape arrangement. This is in contrast to the generally x-shape arrangement shown in FIGS. 3A-3B. The y-shape arrangement enables or provides for the pressure side main body cooling passages 416 to have larger cross-sectional areas (relative to a flow direction through the respective cooling passages) than the suction side main body cooling passages 418.

Each of the main body cooling passages 416, 418, 420 may be fluidly separated from each adjacent cooling passage. A cooling flow may enter each main body cooling passage 416, 418, 420 at a root of the airfoil 400 and the cooling flow may flow radially outward from the root toward the tip, as will be appreciated by those of skill in the art. In some embodiments, the cooling flow may exit the main body cooling passages 416, 418, 420 through tip purge holes located at a tip of the airfoil. In some embodiments, the cooling flow may exit the main body cooling passages 416, 418, 420 into a tip flag cooling passage, as will be appreciated by those of skill in the art. In some embodiments, the cooling flow may exit the main body cooling passages 416, 418, 420 and may be directed toward and out a trailing edge flag exit slot, as will be appreciated by those of skill in the art. Further, in some embodiments, the cooling flow may exit the main body cooling passages 416, 418, 420 through one or more film holes located on/in the respective pressure side exterior wall 406 or suction side exterior wall 408.

In some embodiments, and as shown, the internal passage may be used to provide resupply cooling air flow through one or more resupply flow apertures 426 between the pressure side main body cooling passages 416, the suction side main body cooling passages 418, and the isolated main body cooling passages 420. The resupply flow apertures 426, as shown, can emanate from the isolated main body cooling passages 420 to one or more of the pressure side main body cooling passages 416 and/or the suction side main body cooling passages 418. Similarly, the resupply flow apertures 426 can emanate from a pressure side main body cooling passage 416 to supply cooling air to a suction side main body cooling passage 418. Such fluid connections can enable relatively higher pressure and lower temperature cooling air to be provided to the suction side main body cooling passages 418. The resupply of higher pressure, colder cooling air from the internal main body cooling passages 420 and/or the larger pressure side main body cooling passages 416 may be required to mitigate internal flow separation that may occur in the relatively smaller suction side main body cooling passages air passages 418 due to Coriolis forces that occur in rotating air passages. In addition to mitigating adverse internal convective heat transfer consequences related to rotating passages, the resupply flow apertures 426 emanating from the internal main body cooling passages 420 may also be necessary to mitigate excessive cooling air heat pickup and/or high pressure losses that may be incurred in both the pressure side main body cooling passages 416 and the suction side main body cooling passages 418.

Further, in some embodiments and as shown, film cooling hole apertures 428 may be incorporated and emanate from any of the internal cooling passages 410, 412, 414, 416, 418 to expel air to an exterior of the airfoil 400. In some such configurations, it may be necessary to incorporate the resupply flow apertures 426, fed from the internal main body cooling passages 420 and/or the pressure side main body cooling passages 416 to the suction side main body cooling passages 418 to ensure adequate pressure ratio and back flow margin is maintained across the film cooling hole apertures 428 in order to achieve local film cooling effectiveness and thermal cooling performance requirements.

Figure 5:
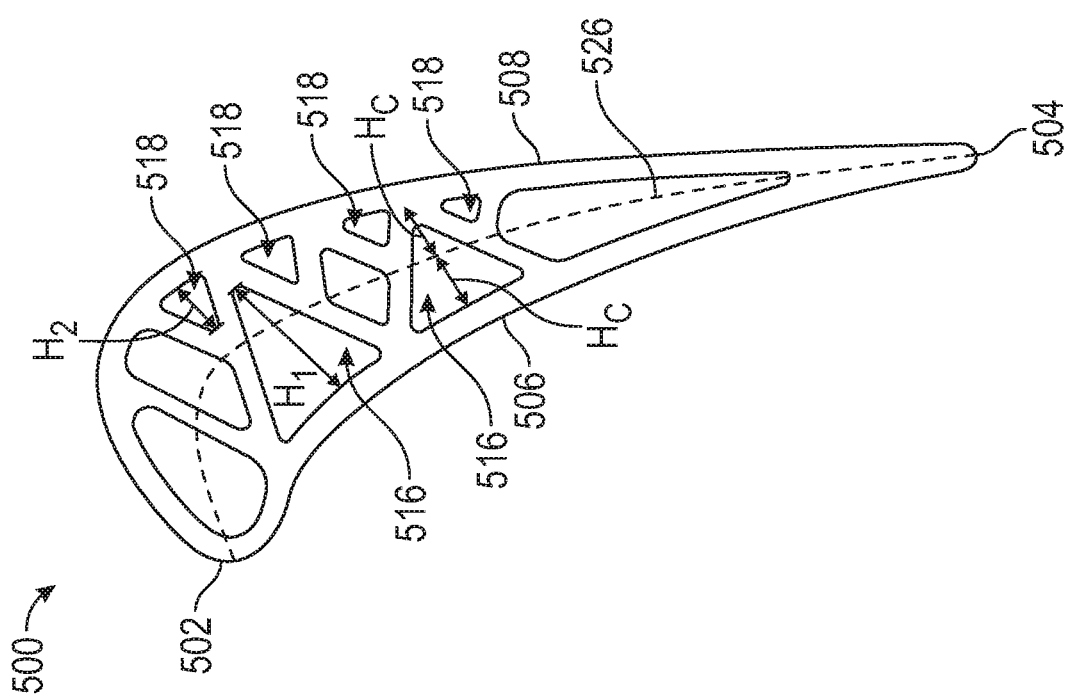
FIG. 5 is a schematic illustration of an airfoil in accordance with an embodiment of the present disclosure.

Turning now to FIG. 5, a schematic illustration of an airfoil 500 in accordance with an embodiment of the present disclosure is shown. The airfoil 500 may be substantially similar to that shown and described with respect to FIG. 4, and thus similar features may not be described or labeled again. The airfoil 500 includes a plurality of pressure side main body cooling passages 516 arranged along an exterior pressure side wall 506 of the airfoil 500 and a plurality of suction side main body cooling passages 518 arranged along an exterior suction side wall 508 of the airfoil 500. The pressure side and suction side main body cooling passages 516, 518 are substantially triangular in shape, as illustratively shown. As described above, the pressure side main body cooling passages 516 are relatively larger than the suction side main body cooling passages 518. Further, as shown (but not labeled), the airfoil 500 includes one or more internal isolated main body cooling passages, leading edge cooling passages, and trailing edge cooling passages.

As shown in FIG. 5, the airfoil 500 (and airfoils in general) have or define a camber line 526. The camber line 526 is a line drawn from a leading edge 502 to a trailing edge 504 of the airfoil 500, with the camber line 526 being equidistant from the exterior pressure side wall 506 and the exterior suction side wall 508 of the airfoil 500. That is, the camber line 526 is midsurface on the airfoil 500 or equidistant from the exterior pressure side wall 506 and the exterior suction side wall 508. Accordingly, along the camber line 526, at any given axial location, a camber line height $H_C$ is the same dimension or distance from both the pressure side and the suction side. In some configurations, the pressure and suction main body cooling passages 516, 518 may be defined relative to the camber line 526. For example, as shown in FIG. 5, the pressure side main body cooling passages 516 extend across the camber line 526 in a direction between the exterior pressure side wall 506 and the exterior suction side wall 508. Stated another way, the camber 526 passes through the interior of the pressure side main body cooling passages 516. In contrast, the suction side main body cooling passages 518 do not extend across the camber line 526. That is, the camber line 526 does not pass through an interior of the suction side main body cooling passages 518.

As illustratively labeled, the pressure side main body cooling passages 516 have a first passage height $H_1$ that is defined as a maximum height of the cooling passage from a hot wall side (i.e., along the pressure side exterior wall 506) to an apex of the same cooling passage (e.g., proximate the opposing suction side exterior wall 508). As used herein, the term apex of a cooling passage refers to a portion of a cooling passage defined by the junction of two ribs (e.g., ribs 422, 424 shown in FIG. 4). The base of the cooling passage is a side of the respective cooling passage along a hot wall of the airfoil. Stated another way, the base may be defined as an axial length of the cooling passage along a wall thereof and the apex is a point or location where two ribs that define the cooling passage intersect with or extend from a side wall of the airfoil. The suction side main body cooling passages 518 have a second passage height $H_2$ that is defined as a maximum height of the cooling passage from a hot wall side (i.e., along the suction side exterior wall 508) to an apex of the same cooling passage (e.g., at the junction of two ribs). In some configurations, the heights of the respective pressure and suction side main body cooling passages may be defined relative to the camber line height $H_C$. For example, in some non-limiting embodiments, the pressure side main body cooling passages 516 may have a passage height defined as $1.1 \cdot H_C \leq H_1 \leq 2.0 \cdot H_C$. Further, in some non-limiting embodiments, the suction side main body cooling passages 518 may have a passage height defined as $0.1 \cdot H_C \leq H_2 \leq 1.0 \cdot H_C$.

It will be appreciated that in some embodiments, the surfaces of walls or ribs that define the main body cooling passages described herein can include one or more heat transfer augmentation features. Heat transfer augmentation features can include, without limitation, normal trip strips, chevron trip strips, angled trip strips, pin fins, hemispherical protrusions, etc. In some configurations such heat transfer augmentation features may be arranged on the hot surfaces of the respective cooling passages (i.e., on the pressure or suction side exterior walls that define, in part, surfaces of the main body cooling passages).

Figure 6:
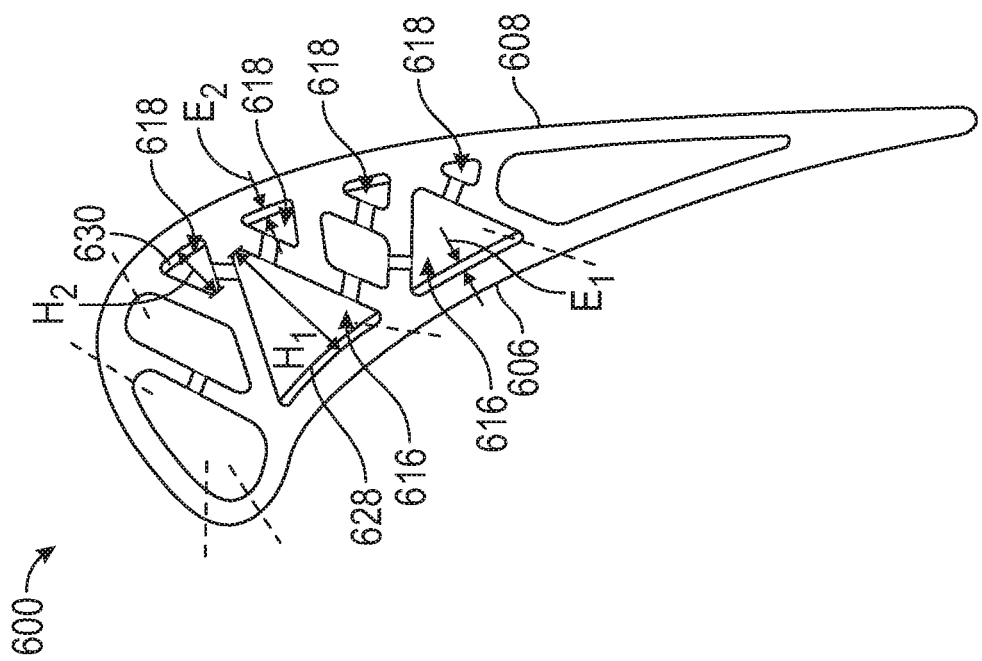
FIG. 6 is a schematic illustration of an airfoil in accordance with an embodiment of the present disclosure.

For example, turning now to FIG. 6, a schematic illustration of an airfoil 600 in accordance with an embodiment of the present disclosure is shown. The airfoil 600 may be substantially similar to that shown and described with respect to FIG. 4, and thus similar features may not be described or labeled again. The airfoil 600 includes a plurality of suction side main body cooling passages 616 arranged along a pressure side exterior wall 606 of the airfoil 600 and a plurality of suction side main body cooling passages 618 arranged along a suction side exterior wall 608 of the airfoil 600. As described above, the pressure side main body cooling passages 616 are relatively larger than the suction side main body cooling passages 618. Further, as shown (but not labeled), the airfoil 600 includes one or more internal isolated main body cooling passages, leading edge cooling passages, and trailing edge cooling passages. The pressure side and suction side main body cooling passages 616, 618 are substantially triangular in shape, as illustratively shown.

In this illustrative embodiment, the pressure side main body cooling passages 616 and the suction side main body cooling passages 618 each include respective heat transfer augmentation features 628, 630. First heat transfer augmentation features 628 are located within the pressure side main body cooling passages 616 and are formed on the pressure side exterior wall 606 of the airfoil 600. Second heat transfer augmentation features 630 are located within the suction side main body cooling passages 618 and are formed on the suction side exterior wall 608 of the airfoil 600.

As illustratively labeled, the pressure side main body cooling passages 616 have a first passage height $H_1$ that is defined as a maximum height of the cooling passage from a hot wall side (i.e., along the pressure side exterior wall 606) to an apex of the same cooling passage (e.g., proximate the opposing suction side exterior wall 608). As used herein, the term apex of a cooling passage refers to a portion of a cooling passage defined by the junction of two ribs (e.g., ribs 422, 424 shown in FIG. 4). The base of the cooling passage is a side of the respective cooling passage along a hot wall of the airfoil. Stated another way, the base may be defined as a length of the cooling passage along a wall thereof from a location where two ribs that define the cooling passage intersect with or extend from a side wall of the airfoil. The suction side main body cooling passages 618 have a second passage height $H_2$ that is defined as a maximum height of the cooling passage from a hot wall side (i.e., along the suction side exterior wall 608) to an apex of the same cooling passage (e.g., at the junction of two ribs).

In these pressure and suction main body cooling passages 616, 618, as shown, the heat transfer augmentation features 628, 630 are formed on the respective pressure and suction side exterior walls 606, 608. The first heat transfer augmentation features 628 have a first height $E_1$, which may be defined as a depth or length of extension from the respective pressure side exterior wall 606 into the pressure side main body cooling passage 616. The second heat transfer augmentation features 630 have a second height $E_2$, which may be defined as a depth or length of extension from the respective suction side exterior wall 608 into the suction side main body cooling passage 618. The heights $E_1$, $E_2$ of the heat transfer augmentation features 628, 630 may be between 0.005 inches (~0.0127 cm) and 0.020 inches (0.0508 cm). In some non-limiting embodiments, the heat transfer augmentation features 628, 630 may be trip strips that are normal to a flow direction, skewed at an angle to the flow direction, or chevron shaped.

The dimensions of the pressure and suction main body cooling passages 616, 618, in some embodiments, may be defined, in part, based on a relationship between the passage height (H) and the height of the heat transfer augmentation features (E) in the cooling passage. In accordance with some embodiments of the present disclosure, the pressure side main body cooling passages 616 (i.e., the relatively larger cooling passages) may be defined by a relationship of $$\frac{E_1}{H_1} < 0.05.$$

The suction side main body cooling passages 618 (i.e., the relatively smaller cooling passages) may be defined by a relationship of $$0.50 \geq \frac{E_2}{H_2} \geq 0.10.$$

It will be appreciated that in the embodiments of FIGS. 5-6, the various internal cooling passages can include interconnecting resupply cooling flow apertures and/or film cooling hole apertures to fluidly connect to an exterior of the airfoil body, as described above. As described above, such apertures can be employed to ensure desired cooling of the airfoil. For example, such fluid apertures can be employed to ensure adequate pressure ratio and back flow margin is maintained across film cooling hole apertures in order to achieve local film cooling effectiveness and thermal cooling performance requirements. Further, the resupply flow apertures can provide a fluidic connection through which relatively higher pressure and lower temperature cooling air may be provided to adjacent/connected cooling passages. The resupply of higher pressure, colder cooling air from one cooling passage to another may be required to mitigate internal flow separation that may occur due to Coriolis forces that occur in rotating air passages. In addition, to mitigating adverse internal convective heat transfer consequences related to rotating passages, the resupply flow apertures can be employed to mitigate excessive cooling air heat pickup and/or high pressure losses that may be incurred in some cooling passages.

The formation of such apertures (resupply and/or film cooling) may be aided by the cooling passage geometries described herein. That is, the film holes and hole drill manufacturing capability may be improved through incorporation with embodiments of the present disclosure. In conventional rectangular shaped cooling passages the internal ribs or walls of the passages are nearly perpendicular to the local internal and exterior wall surfaces. Thus, during manufacturing of the film cooling apertures, a drilling process may be limited to prevent back strike. However, the use of triangular cooling passages, as shown and described herein, enable improved back strike distance for drill bits. Furthermore, shallower surface angles may be employed, as compared to rectangular passages, due to the triangular passage shapes of the pressure and suction side cooling passages. Additionally, increased wall thickness may be located at the apex of a passages where two internal ribs meet an exterior hot wall. The local increase in metal thickness enables larger film cooling hole diffuser geometries with increased area ratio to be utilized. The increased geometric coverage of the film cooling holes enable higher film cooling effectiveness levels to be achieved, thereby reducing the external heat flux along the exterior airfoil surface, resulting in lower operating metal temperatures and improved durability capability.

Advantageously, embodiments of the present disclosure are directed to improved cooling schemes for airfoils, and particularly blades, or gas turbine engines. The rotation of the blade sets up a Coriolis effect inside the cooling passages that causes the convective heat transfer to increase along the "trailing" internal wall surface of the plurality of pressure side cooling passages of radially outward flowing cooling passages, while the internal convective heat transfer decreases along the "leading" internal wall surface of the plurality of suction side cooling passages of radially outward flowing cooling passages. The larger (cross-sectional area in a flow direction) the passage, the greater the Coriolis effect. Advantageously, embodiments of the present disclosure implement relatively larger cooling passages on the pressure side. The large pressure side passages take advantage of the Coriolis effect to significantly increase the heat transfer on the hot pressure side exterior wall and reduce the heat transfer on the cold internal ribs. Meanwhile, the small suction side passages minimize the effect that Coriolis has on the suction side exterior wall. This creates a more uniform temperature gradient throughout the part.

In addition, advantageously, the arrangement of ribs creates some main body isolated cooling passages that are isolated from the gaspath. Because the passages are isolated from the gaspath, the cooling air in these passages does not pick up a lot of heat and can be used to cool the hot tip region of the airfoil.

Further, advantageously, because there are no perpendicular ribs or parallel walls in the airfoil, the airfoil is compliant and can tolerate the thermal expansion of the hot pressure and suction side exterior walls without inducing a significant amount of compressive strain.

As used herein, the term "about" and "substantially" are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    a leading edge, a trailing edge, a pressure side exterior wall extending between the leading edge and the trailing edge and defining a pressure side, and a suction side exterior wall extending between the leading edge and the trailing edge and defining a suction side, wherein a plurality of cooling passages are formed within the airfoil;
    a plurality of first interior ribs extend from the pressure side exterior wall to the suction side exterior wall; and
    a plurality of second interior ribs extend from the suction side exterior wall toward the pressure side exterior wall and intersect with one of the first interior ribs of the plurality of first interior ribs, wherein:
    at least one pressure side main body cooling passage is defined between the pressure side exterior wall and two first interior ribs of the plurality of first interior ribs,
    at least one suction side main body cooling passage is defined between the suction side exterior wall, a first interior rib, and a second interior rib, and
    at least one isolated main body cooling passage is defined between two first interior ribs and two second interior ribs,
    wherein the at least one isolated main body cooling passage is configured to supply cooling air to a tip of the airfoil, and
    wherein the airfoil defines a camber line extending from the leading edge to the trailing edge, wherein the camber line is defined as a line that is equidistant from the pressure side and the suction side, wherein the camber line passes through each pressure side main body cooling passage.

2. The airfoil of claim 1, wherein at least one resupply flow aperture is arranged within at least one interior rib such that cooling air is resupplied from the at least one isolated main body cooling passage and at least one of a pressure side main body cooling passage and a suction side main body cooling passage.

3. The airfoil of claim 1, wherein the plurality of cooling passages further comprises at least one leading edge cooling passage arranged along the leading edge of the airfoil.

4. The airfoil of claim 1, wherein the plurality of cooling passages further comprises at least one trailing edge cooling passages arranged along the trailing edge of the airfoil.

5. The airfoil of claim 1, wherein the camber line defines a camber line height $H_C$ and the pressure side main body cooling passage has a passage height from a base to an apex defined as $1.1 \cdot H_C \leq H_1 \leq 2.0 \cdot H_C$.

6. The airfoil of claim 1, wherein the camber line does not intersect any of the suction side main body cooling passages.

7. The airfoil of claim 6, wherein the camber line defines a camber line height $H_C$ and the suction side main body cooling passage has a passage height from a base to an apex defined as $0.1 \cdot H_C \leq H_1 \leq 1.0 \cdot H_C$.

8. The airfoil of claim 1, further comprising a first heat transfer augmentation feature formed on the pressure side exterior wall within the pressure side main body cooling passage and a second heat transfer augmentation feature formed on the suction side exterior wall within the suction side main body cooling passage.

9. The airfoil of claim 8, wherein each of the first and second heat transfer augmentation features have a height between 0.005 inches and 0.020 inches.

10. The airfoil of claim 8, wherein the first heat transfer augmentation feature has a first height $E_1$ and the pressure side main body cooling passage has a first passage height $H_1$, wherein:

$$\frac{E_1}{H_1} < 0.05.$$

11. The airfoil of claim 8, wherein the second heat transfer augmentation feature has a second height $E_2$ and the suction side main body cooling passage has a second passage height $H_2$, wherein:

$$0.50 \geq \frac{E_2}{H_2} \geq 0.10.$$

12. The airfoil of claim 8, wherein each of the first and second heat transfer augmentation features comprises at least one of a normal trip strip, a skewed trip strip, a chevron trip strip, a hemispherical protrusion, and a pin fin.

13. The airfoil of claim 1, wherein a cross-sectional area of the at least one pressure side main body cooling passage in a flow direction through the at least one pressure side main body cooling passage is greater than a cross-sectional area of the at least one suction side main body cooling passage in a flow direction through the at least one suction side main body cooling passage.

14. A gas turbine engine comprising:
a turbine section;
a compressor section; and
an airfoil located in at least one of the turbine section and the compressor section, the airfoil comprising:
a leading edge, a trailing edge, a pressure side exterior wall extending between the leading edge and the trailing edge and defining a pressure side, and a suction side exterior wall extending between the leading edge and the trailing edge and defining a suction side, wherein a plurality of cooling passages are formed within the airfoil;
a plurality of first interior ribs extend from the pressure side exterior wall to the suction side exterior wall; and
a plurality of second interior ribs extend from the suction side exterior wall toward the pressure side exterior wall and intersect with a first interior rib, wherein:
at least one pressure side main body cooling passage is defined between the pressure side exterior wall and two first interior ribs of the plurality of first interior ribs,
at least one suction side main body cooling passage is defined between the suction side exterior wall, a first interior rib, and a second interior rib, and
at least one isolated main body cooling passage is defined between two first interior ribs and two second interior ribs,
wherein the at least one isolated main body cooling passage is configured to supply cooling air to a tip of the airfoil, and
wherein the airfoil defines a camber line extending from the leading edge to the trailing edge, wherein the camber line is defined as a line that is equidistant from the pressure side and the suction side, wherein the camber line passes through each pressure side main body cooling passage.

15. The gas turbine engine of claim 14, wherein at least one resupply flow aperture is arranged within at least one interior rib such that cooling air is resupplied from the at least one isolated main body cooling passage and at least one of a pressure side main body cooling passage and a suction side main body cooling passage.

16. The gas turbine engine of claim 14, wherein the plurality of cooling passages further comprises at least one of a leading edge cooling passage arranged along the leading edge of the airfoil and a trailing edge cooling passage arranged along the trailing edge of the airfoil.

17. The gas turbine engine of claim 14, wherein the camber line does not intersect any of the suction side main body cooling passages.

18. The gas turbine engine of claim 14, further comprising a first heat transfer augmentation feature formed on the pressure side exterior wall within the pressure side main body cooling passage and a second heat transfer augmentation feature formed on the suction side exterior wall within the suction side main body cooling passage.

19. The gas turbine engine of claim 14, wherein a cross-sectional area of the at least one pressure side main body cooling passage in a flow direction through the at least one pressure side main body cooling passage is greater than a cross-sectional area of the at least one suction side main body cooling passage in a flow direction through the at least one suction side main body cooling passage.

20. The airfoil of claim 1, wherein the supply of cooling air to the tip of the airfoil from the isolated main body cooling passage is through one of a purge hole in tip of the airfoil or into a tip flag cooling passages of the airfoil.

* * * * *